United States Patent [19]

Egli

[11] Patent Number: 5,733,039
[45] Date of Patent: Mar. 31, 1998

[54] SEALING PLATE FOR SEALING A ROTOR UNIT

[75] Inventor: Ernst Egli, Fahrweid, Switzerland

[73] Assignee: Sika Equipment AG, Widen, Switzerland

[21] Appl. No.: 732,547

[22] Filed: Oct. 8, 1996

[30] Foreign Application Priority Data

Oct. 9, 1995 [EP] European Pat. Off. ............ 95115858

[51] Int. Cl.[6] ............................................. B01F 15/02
[52] U.S. Cl. ........................... 366/10; 366/191; 277/24; 277/234
[58] Field of Search .................. 366/10, 12, 13, 366/42, 51, 64, 65, 101, 102, 106, 184, 190, 191, 194, 195, 349; 277/24, 234; 415/174.2, 174.3

[56] References Cited

U.S. PATENT DOCUMENTS 3,120,919  2/1964  Gardiner ................. 415/174.4 X
3,672,646  6/1972  Burtin .......................... 366/13
5,433,519  7/1995  Irsch ......................... 366/10 X

FOREIGN PATENT DOCUMENTS

1193410  5/1965  Germany ..................... 366/13
1740679  6/1992  U.S.S.R. ..................... 366/10

Primary Examiner—Charles E. Cooley
Attorney, Agent, or Firm—Pearne, Gordon, McCoy & Granger LLP

[57] ABSTRACT

A sealing plate for a rotor unit of a spray machine to seal the rotor unit has with respect to the stator. The rotor unit has a plurality of surrounding bushings that have at both sides thereof. The spray machine includes a filling opening, a pressurized air inlet opening and an ejection opening. The openings are arranged such that rotation of the rotor unit causes the bushing openings to pass over the air inlet and injection openings. The sealing plate includes at least one opening and an elastic plate. A metallic stripping off element is disposed adjacent the at least one opening.

9 Claims, 7 Drawing Sheets

SEALING PLATE FOR SEALING A ROTOR UNIT

BACKGROUND OF THE INVENTION

The present invention is directed to a sealing plate for sealing a rotor unit at a spray machine with respect to the stator of said spray machine, whereby said rotor unit carries at its periphery a multitude of bushings which are open at both sides and which are arranged with their axes pointing in a direction with at least one direction component parallel to an axis of said rotor and comprising, stationary with respect to the machine rotor or frame, a filling opening at a filling arrangement, a pressurized air inlet opening, an ejection opening being located opposite to said pressurized air inlet opening, considered in direction of said axes of said bushings, whereby all said openings are so arranged that, when the rotor unit rotates, the openings of said bushings pass over said openings, and whereby said sealing plate comprises at least one opening and an elastic plate.

Sealing plates of this kind, which interact between the spray machine stator and the front plates of the rotor unit, are known. They are primarily construed of an elastic plate. Especially at the pressurized air opening, at the ejection opening and the filling opening, it is further known to provide stripping-off elements made of metal and arranged in the peripheral area of the respective opening at the respective sealing plate, thereby facing against rotational direction of the rotor unit.

Thereby, it is of utmost disadvantage that the metallic stripping-off elements and the sealing surfaces of the respective sealing plate are differently eroded by wear of the spray medium, which necessitates a frequent and costly rework of the metal/plate-material surfaces.

Figure 1:
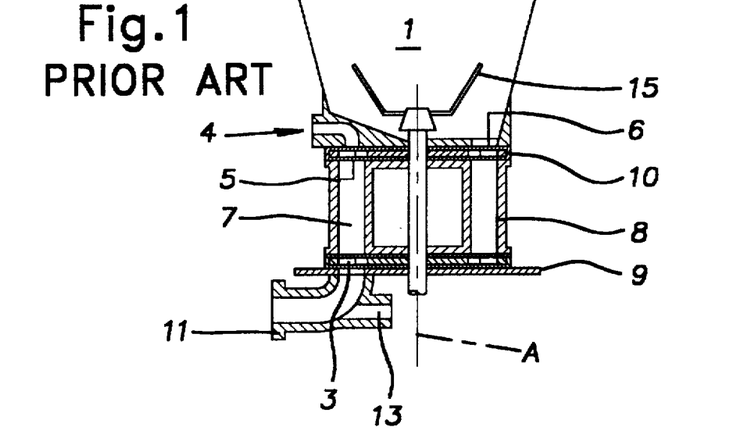
FIG. 1 schematically, a well-known construction of a rotor spray machine.

In FIG. 1 there is schematically shown a concrete spray machine which works according to the rotor principle. Concrete is filled into a hopper 1. Below the hopper 1 a rotor 8 rotates, driven around an axis A. The rotor comprises, similar to a revolver, a multitude of receptacle bushings 7 to receive concrete. At the bottom of hopper 1 there is provided a stationary filling opening 6 so that sequentially the bushings 7, brought into alignment with the opening 6 as the rotor rotates, are filled. The bushings 7, which are respectively brought into alignment with the filling opening 6, are closed at their bottom by means of a stationary sealing plate 9.

On the side of the hopper 1 there is further provided a conduit 4 for pressurized air which is brought via an opening 5 for pressurized air into operational connection with a respective bushing 7 rotated into alignment with said opening 5. In this ejection position, aligned with the opening 5 for pressurized air, the respective bushing 7 is also aligned with an ejection opening 3 at its bottom, which opening 3 is provided in the sealing plate 9. The sealing plate 9 closes, on one hand in filling position, the respective bushing 7 at its bottom and establishes, on the other hand, for ejecting the concrete filled in the respective bushing 7, tightness around the ejection opening 3. An upper sealing plate 10 acts on the upper side of the rotor 8.

The ejection opening 3 propagates via a bent section 11 into a conveying conduit which is not shown in the figure. A conveying pipe 13 for pressurized conveyor air abuts into the curved section 11. A driven stirring arrangement 15 acts within hopper 1.

Such a concrete spray machine works according to the so-called "low density jet principle" at which the medium to be ejected, concrete, practically floats within the pressurized air which is fed by conduit 13. Thereby, the concrete is conveyed along the conveying conduit connected to the bent section 11. Along this conveying conduit water and possibly further additives are controllably added to the spray medium.

SUMMARY OF THE INVENTION

It is an object of the present invention to provide a sealing plate of the kind mentioned above, which, with respect to the stripping-off elements foreseen, does remedy the above mentioned drawbacks.

According to the present invention, in the peripheral area of the at least one opening in the plate a metallic stripping-off element is provided which abuts freely at one side of the plate and which is resiliently or yieldably mounted, considered in the direction of the thickness of the plate.

So as to fulfill a further object, namely to seal off a considerable area of the respective rotor front side and so as to thereby increase sealing effect, in a preferred embodiment, the sealing plate is formed as an annular ring segment or as a semi-annular segment.

In a further embodiment, the inventive sealing plate comprises, residing upon the elastic plate, a metal plate and the at least one stripping-off element is mounted to a spring-like member worked out of the metal plate, which spring-like member immerses into the material of the plate.

Especially if the inventive sealing plate is applied in the area of the filling opening, there is provided within the plate an opening with the shape of an annular segment and thereby the stripping-off element is provided in the area of one end of said segment-shaped opening.

In a further embodiment, an opening in the plate cooperating with the pressurized air inlet opening, comprises an insert which is mounted to the periphery of this opening at at least two distinct loci and which acts to narrow the cross-sectional area of this opening to form a nozzle.

BRIEF DESCRIPTION OF THE DRAWINGS

Further preferred embodiments will be apparent with reference to the following detailed description and drawings, wherein.

DETAILED DESCRIPTION OF THE PREFERRED EMBODIMENTS

Figure 2:
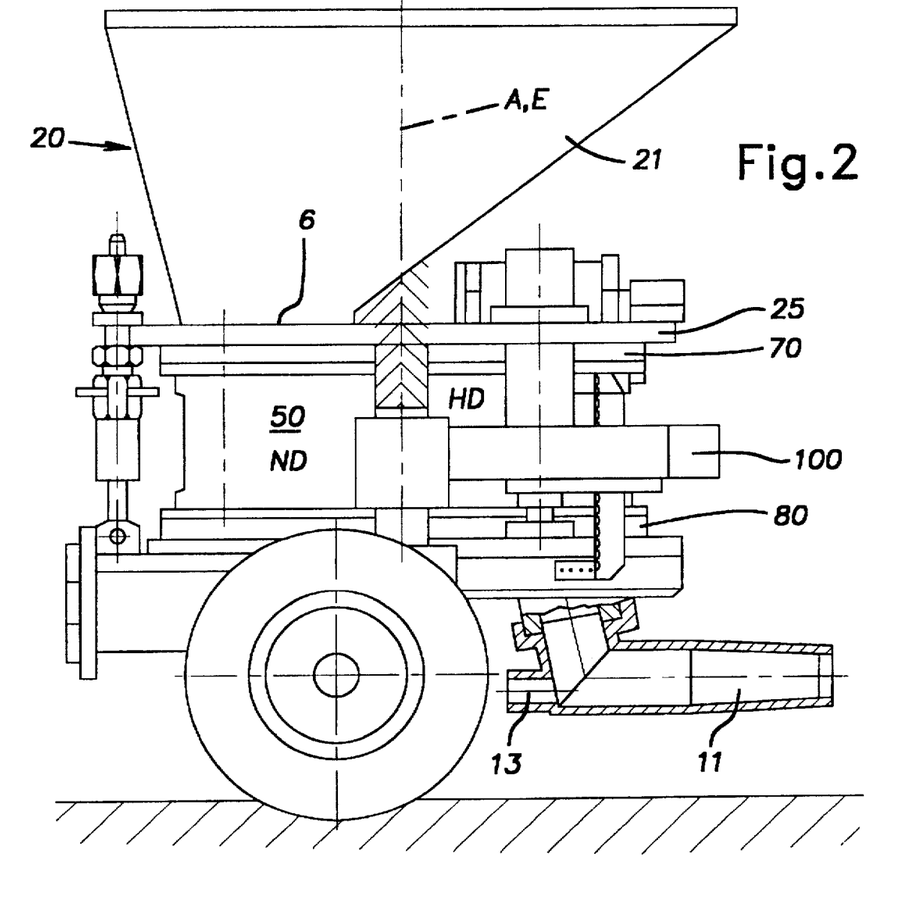
FIG. 2 a lateral view of a simplified spray machine according to the present invention.

In FIG. 2 there is shown, in a lateral view, a rotor concrete spray machine according to the present invention, without representation of the customary provided control and driving devices which are mounted on the same carriage. By means of this figure, the principle inventive functional units shall be presented at the machine according to the present invention which functional units shall later be described in details.

The machine according to the present invention comprises, as is customary, a filling arrangement 20 with a filling hopper 21 with a stirring arrangement (not shown) as well as with a vibrator (not shown). As was shown in connection with FIG. 1, the hopper 21 finally abuts in the filling opening 6 for the rotor bushings 7. The filling arrangement 20 is mounted to a machine frame 25.

The machine according to the invention further comprises a rotor arrangement 50, an upper stationary sealing arrangement 70 as well as a bottom stationary sealing arrangement 80. The rotor arrangement 50 as well as the sealing arrangements 70 and 80 are divided by means of a plane E, along axis A of the rotor and considered in direction of axis A, in a low pressure section ND and a high pressure section HD. In the low pressure section ND the spray medium is filled through the filling arrangement 20 into the rotor arrangement 50 substantially under ambient pressure conditions. At the high pressure section HD, and as was explained with the help of FIG. 1, the spray medium is ejected by means of pressurized air from conduit 4 through conduit 13. The two sections ND and HD are schematically shown in FIG. 2 by the respective shading on both sides of the plane E containing the rotor axis A.

Along the high pressure section HD there is further provided a biasing arrangement 100 with which, on one hand, an easy access to the rotor arrangement 50 as well as to the high pressure sided parts of the sealing arrangements 70 and 80 is enabled and with which, on the other hand, and as will be explained later, the sealings at the high pressure section HD with respect to the rotor are established.

The inventive units of the inventive machine shall now be explained more in details.

Figure 3:
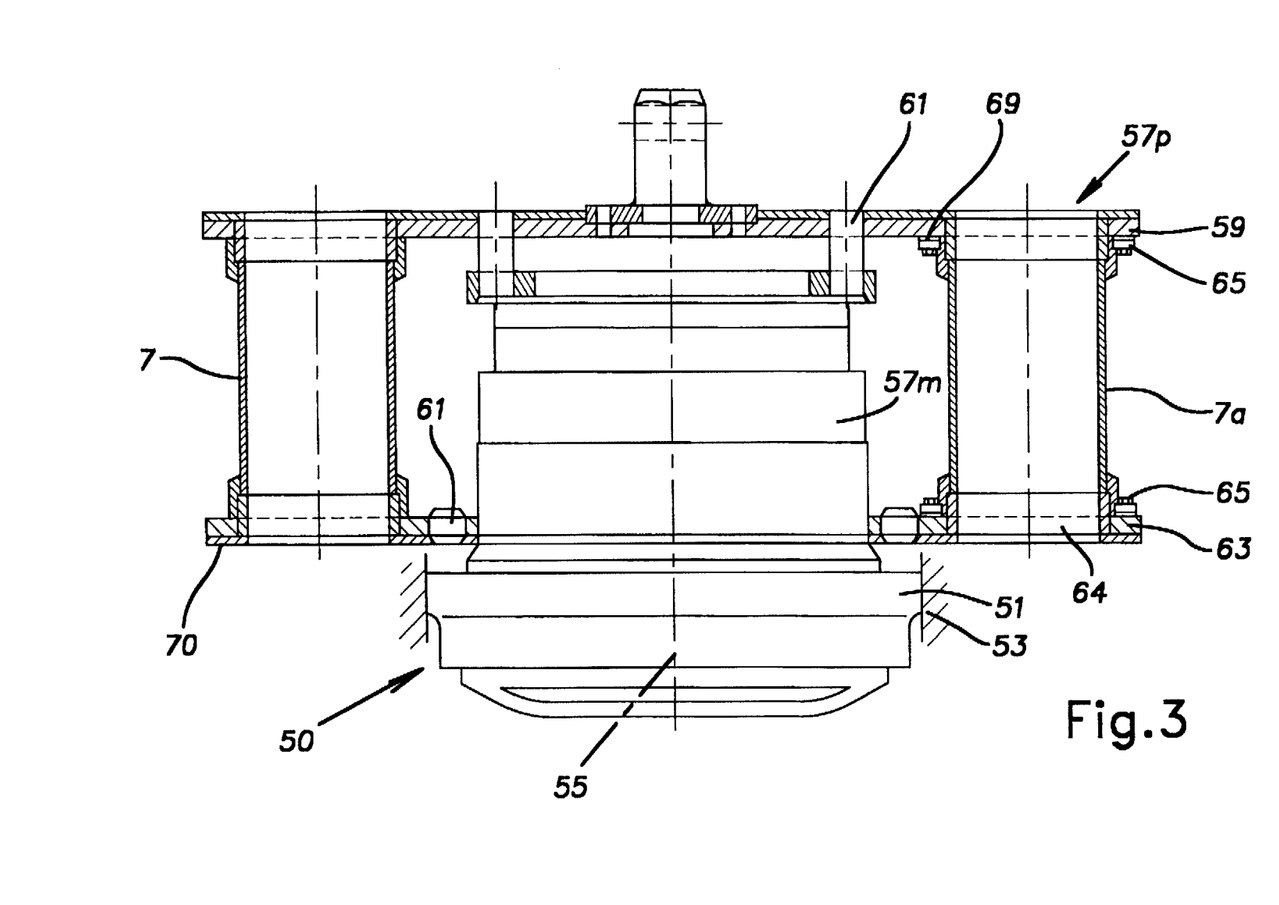
FIG. 3 in a partly sectional view the machine rotor unit with a drive motor at a machine according to the present invention.

In FIG. 3 a rotor unit 50 as implied in a machine according to the present invention is shown in a simplified and partially sectional representation. The rotor unit 50 comprises a hydraulic hub motor 51 as for instance a "Poclain" motor with, as is schematically shown at 53, a motor stator 55 rigidly mounted to the machine frame 25 (FIG. 2) which stator 55 is formed by the motor axis.

Such hydraulic hub motors are known from the technical field of single wheel drives of excavator machines. The construction of such hub motors is extremely flat, as may be seen from considering FIG. 3. The rotor of the hub motor, 57m, which rotates around axis 55, is extended, according to the axial extent of the machine rotor 57p and carries the machine rotor 57p. The machine rotor 57p is construed from an upper rotor terminating plate 59 which is driven from the motor rotor 57m via upper and lower connecting and torque transferring bolts 61. The arrangement of the upper transferring bolts 61 is shown in top view of the rotor in FIG. 4, too.

Figure 4:
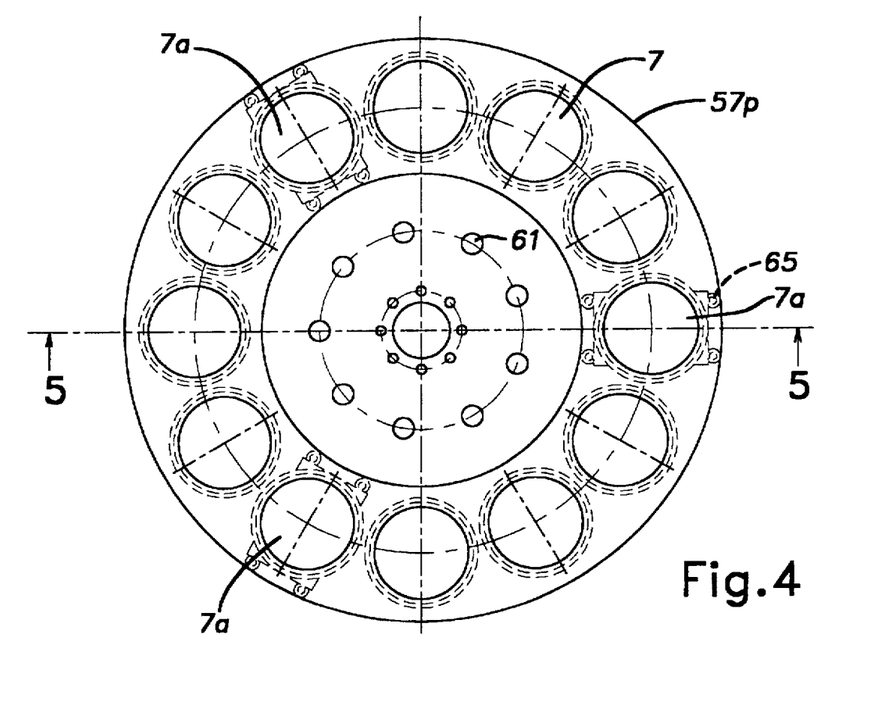
FIG. 4 a top view of the rotor unit according to FIG. 3.

As was explained, along the periphery of the machine rotor 57p a multitude of bushings 7 is provided, for instance comprising twelve bushings, as may be seen from FIG. 4. At least three of the multitude of bushings 7 are construed as biasing bushings which are depicted in FIGS. 3 and 4 with the reference number 7a. They provide for mechanical integrity of the rotor 57p. To ensure mechanical integrity, the three bushings 7a are tightened to the upper and to the lower rotor terminating plates 59 and 63 by means of screw bolts 65. The remaining bushings 7 are merely held by the biasing action of the biasing bushings 7a between the plates 59 and 63.

As may be seen, the machine rotor 57p, formed as a modular unit by means of the plates 59, 63 as well as the bushings 7a and 7, may be removed by lifting it from the transmitting bolts 61 at the rotor 57m of the hub motor. The machine rotor 57p is extremely light-weight and comprises substantially only parts which are necessary for its proper functioning. This significantly contributes to reduction of the driving power of the motor provided for driving the rotor.

The drive of the machine rotor 57p is directly transmitted from rotor 57m of the hub motor via the bolts 61. The rotor bushings 7, 7a do not transmit any torque which fact further contributes to the "light-weight" construction of the machine rotor 57p.

Figure 5:
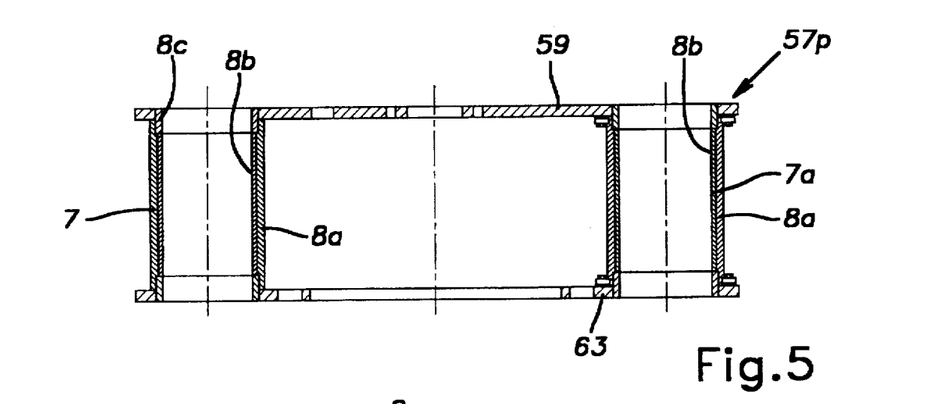
FIG. 5 a modular construction of the machine rotor according to the present invention.

The modularly removable machine rotor 57p is shown in FIG. 5 in a cross-sectional representation. In a preferred realization form and as shown especially in FIG. 5, the bushings 7 and 7a are formed by outer tubes 8a and, introduced therein, exchange bushings 8b. Thus, the bushings 8b may easily be replaced as those parts are extremely exposed to spray medium wear.

Figure 6:
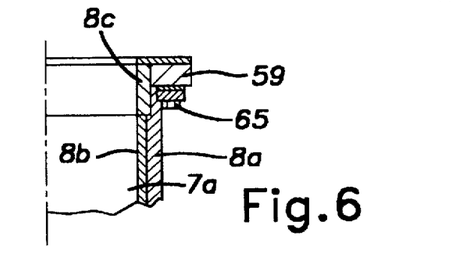
FIG. 6 an enlarged section at the machine rotor according to FIG. 5 which shows the connections of the bushings to rotor end plates.

In FIG. 6 there is shown, in an enlarged representation, the upper terminating part of a bushing 7a with the outer tube 8a, the exchange bushing 8b and further with a junction biasing ring 8c for the exchange bushing 8b. At the lower end the mount of the bushing 7a is equal, as may be seen from FIG. 3. This is also valid for the two-sided mount of bushings 7, which nevertheless have no screw connections 65.

As may be seen especially from FIG. 3 there is preferably provided on the upper rotor terminating plate 59 as well as at the lower rotor terminating plate 63, respectively, a wear exposed protective sheet 69 and 70 which sheets are (not shown) tightened to the respective plates by means of screws.

It must be emphasized that the upper and lower rotor terminating surfaces are exposed to relatively high wear, e.g. from sand or dust, as may be seen from the principal functioning as was explained with the help of FIG. 1. Therefore, the wear protective sheets 69 and 70 allow for an easy and quick replacement of the rotor's wear exposed surfaces.

Figure 7:
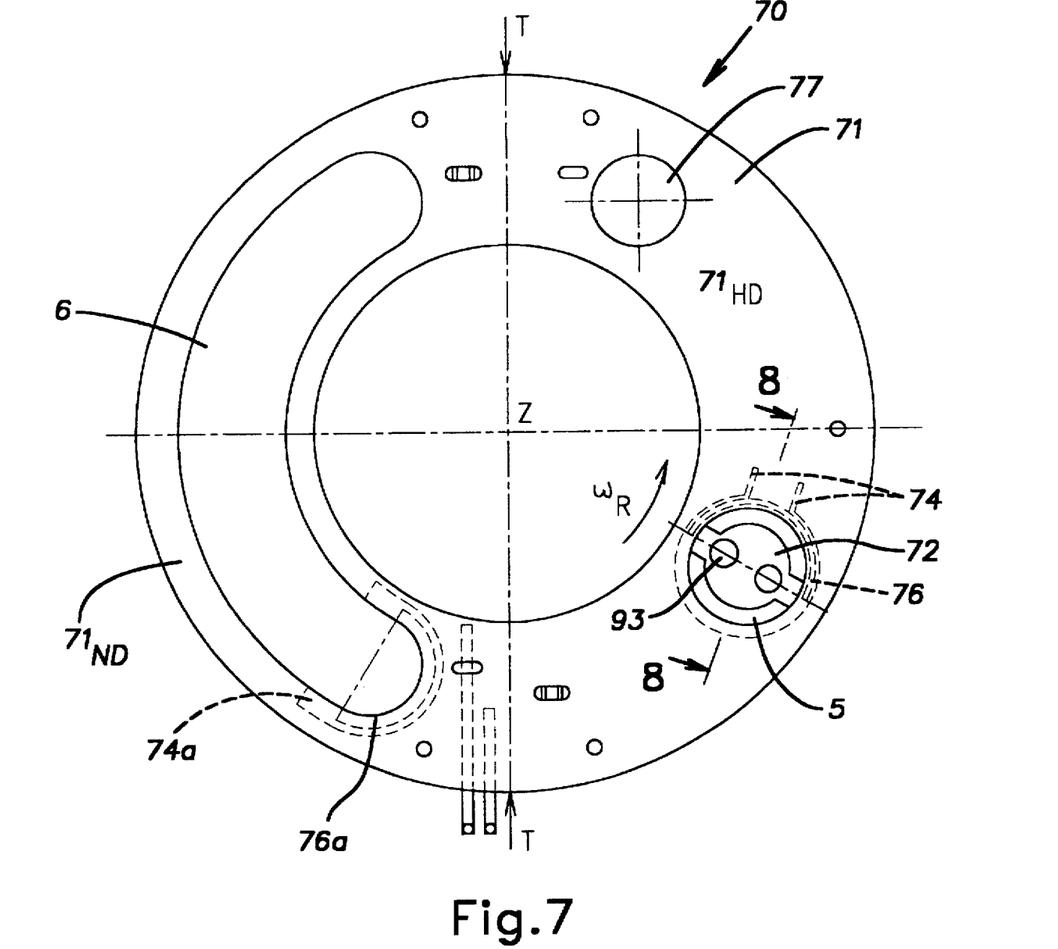
FIG. 7 a sealing plate arrangement as it is preferably implied at the machine according to the present invention stationarily with respect to the machine stator or machine frame.

The upper transition area from rotor unit 50 to frame-sided connections, namely to the inlet arrangement 20 and to the pressure conduit 4, according to FIG. 1, occurs along an upper sealing plate arrangement 70 according to FIG. 7. The upper sealing arrangement 70, which is stationary, is formed by a substantially annular elastic plate 71, preferably made of rubber and comprising a high pressure sided segment 71HD and a low pressure sided segment 71ND. At the high pressure sided segment 71HD the opening 5 for pressurized air according to FIG. 1 is provided.

Figure 8:
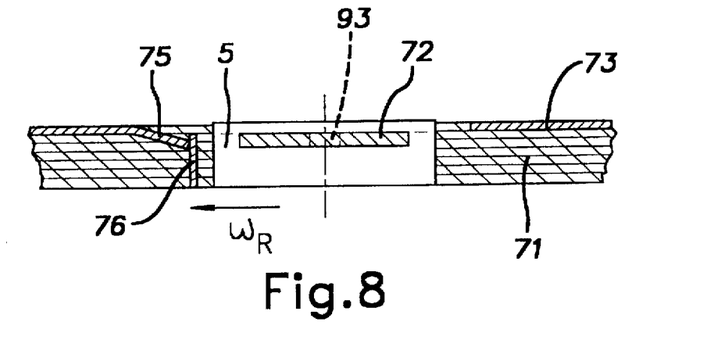
FIG. 8 in a partly sectional representation according to line VIII—VIII of FIG. 7 a part of the sealing plate arrangement with the inventively provided spring mounted stripping-off element.

With respect to the center Z of the annular plate extending in radial direction there is provided in opening 5, as may be seen especially in FIG. 8, a substantially circular cross piece 72 with nozzle openings 93. Thereby, there is realized a nozzle-like transition through openings. The plate 71, preferably made of hard vulcanized rubber, comprises at its upper side a metal cover plate 73 in which the cross piece 72 is formed.

In FIGS. 7 and 8 the rotor movement is shown with respect to the stationary plate 71 with the arrow $w_R$. The cover plate 73 is cut adjacent to the opening 5 and as is shown at 74. Thereby, there is formed, as especially shown in FIG. 8, a spring-like piece 75 extending within plate 71. At the end of said-spring like piece 75 there is welded a strip-off element 76 having the shape of a semi-circle (see FIG. 7). The strip-off element 76 abuts at the bottom side of plate 71, i.e. at the surface of the plate which frictionally contacts the upper rotor surface. It is spring mounted due to the spring action of the material of plate 71 and of the spring-like piece 75. Thus, there is provided for a tight auto-adjusting strip element 76 contacting the upper rotor terminating surface.

Via pressurized air opening 5 and via pressurized air conduit 4 according to FIG. 1 the filling content of a respective rotor bushing 7, 7a is ejected. Due to this ejection which occurs at high overpressure the just emptied rotor bushing 7, 7a remains on overpressure with respect to ambient pressure even as such bushing continues rotation in direction R by rotation of the rotor 50.

Therefore, there is provided, downstream of opening 5, considered in direction $w_R$ of rotation, in the plate 71 a pressure decharge opening 77 which communicates with ambient. Through this pressure decharge opening 77 there occurs pressure equalization with ambient before the rotor bushing 7, 7a considered reaches the low pressure section 71ND of plate 71.

The low pressure segment 71ND of plate 71 is formed as an annular segment and comprises the filling opening 6 according to FIG. 1. At the filling opening 6 more than one, as e.g. four and a half bushings 7, 7a of the rotor unit 50 are simultaneously filled. Considered in the direction $w_R$ of rotor rotation, there is provided at the end of opening 6 again a strip-off element 76a located and realized at plate 71 by means of a spring-like piece 74a of covering plate 73 according to FIG. 8 and thus in analogy to the element 76 at the opening 5 for pressurized air.

Important features of the upper plate 71 frictionally contacting the rotor are, on one hand, the strip-off elements 76 and 76a realized within the rubber plate material and spring mounted and, on the other hand, provision of pressure equalization opening 77.

According to FIG. 9 there is provided below the rotor unit 50 a stationary bottom sealing plate 81 which is of annular shape and is made of elastic material, preferably again of rubber. The bottom sealing plate 81, too, may be subdivided in a high-pressure sided segment 81HD and a low-pressure sided segment 81ND. On the high-pressure side there is provided the ejection opening 3 according to FIG. 1 in alignment with the opening 5 for pressurized air according to FIG. 7.

At the ejection opening 3 there is provided a strip-off element 76 arranged and construed as was explained with respect to such strip-off element 76 at the opening 5 for pressurized air. Whereas FIG. 7 shows a representation from above onto the upper sealing plate 71, FIG. 9 shows an upper view on the bottom plate and thus shows the strip-off element 76 freely exposed adjacent the opening 3. Construction of the plate 81 with a covering plate 73 at its bottom, analog to such plate according to FIG. 8, is the same as the construction of the upper plate 71 with the exception that the bottom plate 81 comprises neither a pressure equalization opening 77 nor, as may clearly be seen from FIG. 1, a filling opening 6.

Figure 9:
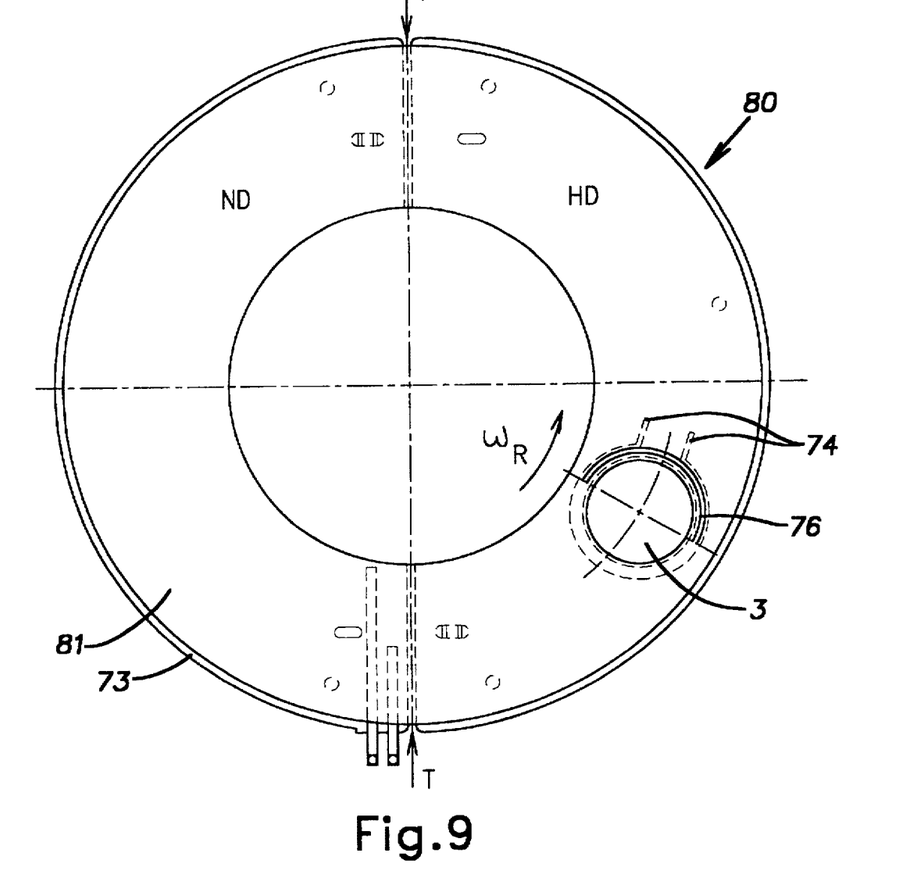
FIG. 9 a top view of the lower sealing plate arrangement which is provided stationarily at a spray machine according to the present invention.

Consideration of FIGS. 1, 7 and 9 together clearly shows that the sealing requirements along the high-pressure section HD between the two plates 71, 81 and the rotor unit 50 are considerably higher than along the low-pressure section ND. Thus, by means of appropriate dimensioning the thickness of the respective sealing plates 71 and 81 along the low-pressure segments 71ND, 81ND slightly smaller than along the high-pressure segments 71HD, 81HD, it is possible to significantly reduce the torque reacting onto the rotor drive. This allows to reduce the drive power requirements at the hub motor 55, 57 (FIG. 3).

Figure 10:
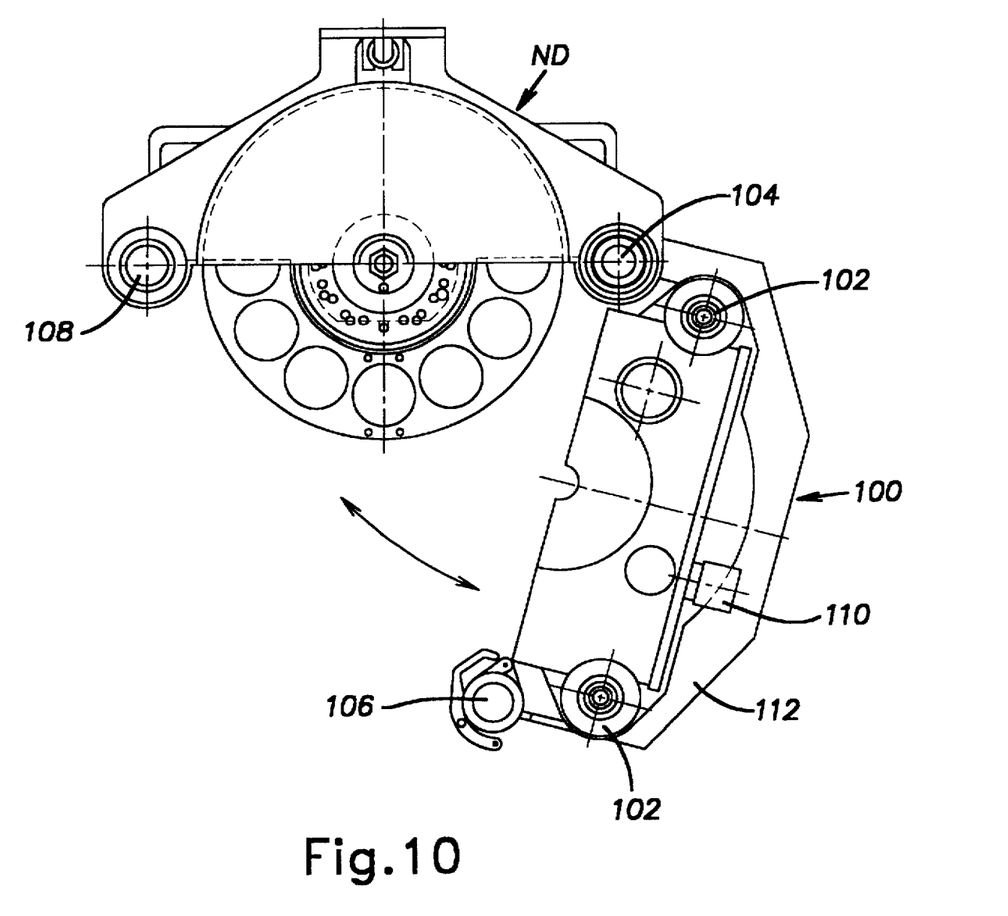
FIG. 10 in a simplified representation and in top view the inventive spray machine with inventively pivotably opened high pressure side sealing arrangement and with the biasing arrangement.

In FIG. 10 there is shown an upper view onto a machine according to the present invention whereby for clearness' sake all devices mounted on top of the machine are not represented. From FIG. 10 a most important feature of the machine according to the present invention may be seen:

The upper and the bottom sealing plates 71 and 81 are, as shown with the reference T in the FIGS. 7 and 9, respectively, separated into segments 71HD, 71ND and 81HD, 81ND.

As will be described, the two high-pressure segments 71HD and 81HD are pivotable around an articulation 104 arranged vertically, i.e. in the cutting plane according to E and may be biased by means of biasing piston arrangements 102. Opposite, with respect to the pivoting articulation 104, there is provided a locking arrangement 106 with which the biasing arrangement 100 may be locked in closed position to the low-pressure sided locking member 108.

The biasing piston arrangement 102 with further devices which are pivoted together with the biasing arrangement 100 as filter stages for the pressure equalization opening 77, a connection 110 for pressurized air to conduit 4 according to FIG. 1 etc. are mounted to a pivotable carrying frame 112.

Figure 11A:
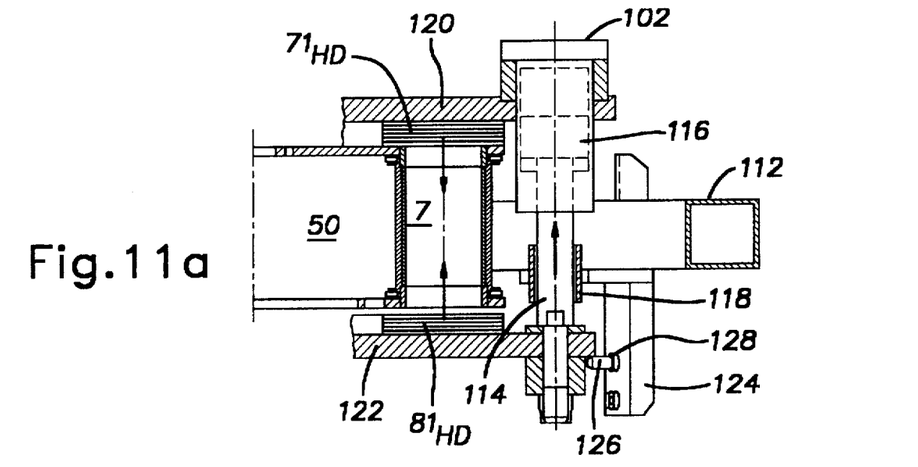
FIG. 11a the biasing piston arrangements provided at the to 11c machine according to the present invention according to FIG. 10 in sealingly biased (a), partly released (b) and entirely released (c) positions.
Figure 11B:
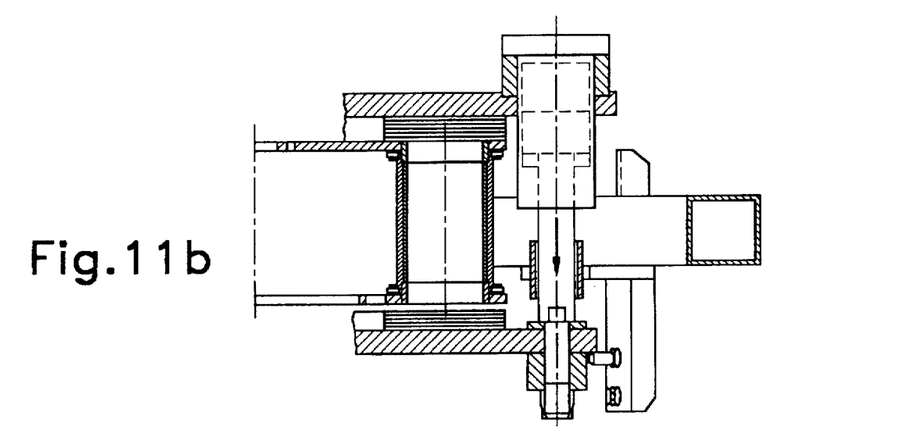
Figure 11C:
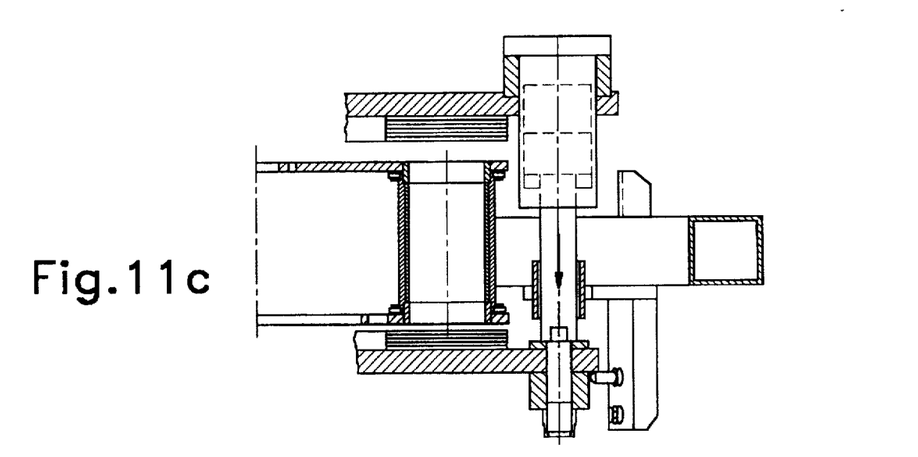

In the FIGS. 11a to 11c there is shown one of the two equally construed biasing piston arrangements 102 in a biasing position (a), in released and downwards lowered position (b) and in released upwards lifted position (c). These positions will be explained.

According to FIG. 11a, which shall be explained in details for afterwards understanding the movement kinetics of the two biasing piston arrangements 102 by means of the FIGS. 11b and c, the piston rod 114 of a cylinder/piston arrangement 116 is axially freely movable within a gliding bushing 118. The cylinder of the cylinder/piston arrangement 116 carries via a mounting plate 120 which, according to FIG. 10, carries both biasing cylinder arrangements 102, the high-pressure sided segment 71HD of plate 71. The piston rod 114 on the other hand carries, again via a carrier plate 122, which is commonly provided for both biasing cylinder arrangements 102, the high-pressure segment 81HD of the bottom plate 81.

By contraction of the hydraulic cylinder/piston arrangement 116 the two high-pressure segments 71HD and 81HD are symmetrically pressed towards each other and to the rotor unit 50 and their bushings 7, 7a.

By means of an adjusting bar 124, slidable with respect to the frame 112, a lower abutment 126 for piston rod 114 of the cylinder/piston arrangement 116 may be positioned. This abutment 126 lies in a biased position of the arrangement 102 according to FIG. 11a and considered in an axial direction distant below an abutment surface 128 at the piston rod 114.

If the cylinder/piston arrangement 116 is now released according to FIG. 11b, first the piston rod 114 is moved onto the abutment 126. Cylinder and plate 120 as well as segment 71HD remain, gravity-driven, stationary. Thus, the bottom seal plate segment 81HD is lowered acc. to FIG. 11b.

By further expanding the cylinder/piston arrangement 116 and as piston rod 114 is on abutment, the cylinder is lifted according to FIG. 11c, so that the mounting plate 120 is lifted commonly with the high-pressure segment 71HD of the upper pressure or sealing plate 71.

As will be shown in connection with the hydraulic scheme, the two biasing cylinder arrangements 102 respectively with their cylinder/piston arrangements 116 are synchronously operated so that in a simple way, on one hand, the required sealing biasing according to FIG. 11a with respect to the rotor unit 50 is realized and, on the other hand, a fully released position according to FIG. 11c in which, according to FIG. 10, the entire frame sided high-pressure section of the biasing arrangement 100 may be opened by pivotment.

By predetermining the pressure onto the biasing cylinder arrangements 102 according to FIG. 11a the required sealing pressure may be adjusted independently from the sealing conditions at the low-pressure sided parts ND according to FIG. 10. Thus, an optimum is reached in that there, where it is required, namely at the HD segments, high surface pressures may be realized whereas, uninfluenced from the high-pressure sided surface pressures, at the low-pressure side, the sealing conditions may be loosened, i.e. significantly lower surface pressures may be installed there. By this feature, the power of the rotor drive motor and especially of the hub motor, as was described, may be reduced by more than 50%. If e.g. at the high-pressure side and at the low-pressure side the same sealing surface pressures are installed between the plates 81, 71 and rotor unit 50 and there results then a required drive power of 41 kW, then and by inventive splitting of low-pressure side and high-pressure side at the inventive machine, the required drive power may be reduced to approx. 19 kW.

Figure 12:
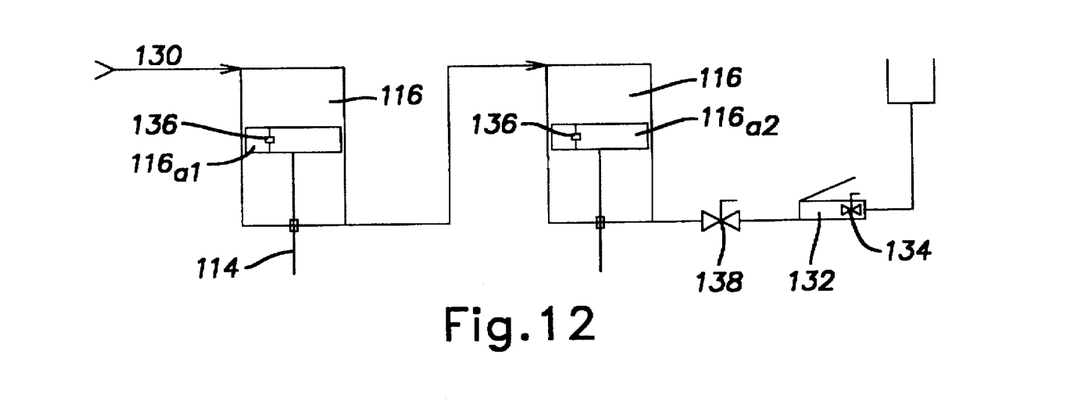
FIG. 12 schematically and simplified the hydraulic scheme for operating the biasing piston arrangements according to FIG. 11 and as provided at the machine according to FIG. 10.

In FIG. 12 there is schematically shown the hydraulic scheme for the cylinder/piston arrangements 116 of the biasing arrangements 102 according to FIG. 11. The two cylinders of the arrangement 116 are connected in series, whereby the volume below piston 116a1, taking the volume occupied by piston rod 114 into account, is equal with the volume above piston 116a2. Via conduit 130 the operating pressure of the machine, e.g. of 18 bar, is applied. For spanning the biasing cylinder arrangements, a high-pressure is generated via a hand pump 132 so that both pistons 116a1, 116a2 are biasingly urged upwards (FIG. 11). Their equal volumina mentioned make sure that both pistons 116a1, 116a2 move the same biasing distance.

For releasing the biasing cylinder arrangement 102, the high-pressure built up by means of hand pump 132 is released for instance with the help of a manually operatable valve 134. Thereby, the two pistons 116a move downwards due to the machine basic pressure of for instance 18 bar and thereby, see FIG. 11, release the rotor unit 50.

At the pistons 116a1, 116a2 mechanical operatable non-return valves 136 of known type are provided. If for instance piston 116a1 reaches, e.g. due to leakage, the lower surface of its cylinder before piston 116a2 reaches the respective surface in its cylinder, then mechanically the valve 136 at piston 116a1 is opened so that, driven by the basic pressure of the machine, the piston 116a2 is finally also driven in abutment position.

Thus, synchronized movement of the pistons 116a is automatically reinstalled whenever necessary.

Between the hand pump 132 and the respective connection to one of the cylinder/piston arrangements 116 there is further and preferably provided a manually operatable valve 138.

What I claim is:

1. A sealing plate for sealing a rotor unit (50) of a spray machine with respect to a stator of said spray machine, said spray machine comprising, at the periphery of said rotor unit (50), a plurality of bushings (7, 7a), said bushings having openings at both ends and bushing axes pointing in a direction with at least one direction component parallel to an axis of said rotor unit (50), said spray machine further comprising, stationary with respect to said machine stator, a filling opening (6) at a filling arrangement (20), a pressurized air inlet opening (5), an ejection opening (3), said ejection opening being located opposite to said pressurized air inlet opening (5) considered in direction of said axes of said bushings, all of said openings being arranged so that, when said rotor unit (50) rotates, the bushing openings pass over said air inlet and ejection openings, said sealing plate comprising at least one opening (5, 6, 3) and an elastic plate, wherein, in the area of a periphery of said at least one opening (5, 3), a metallic stripping-off element (76) is provided, said stripping-off element abutting one side of said sealing plate and being resiliently mounted to said sealing plate for movement in a direction of thickness of said elastic plate.

2. The sealing plate of claim 1, wherein said sealing plate is shaped as a segment of a ring.

3. The sealing plate of claim 1, further comprising a metal plate disposed upon said elastic plate (71), said stripping-off element (76) comprising at least one elastic member shaped into a metal plate (73) and immersing into said elastic plate.

4. The sealing plate according to claim 1, wherein said at least one opening (6) is shaped as an annular segment extending along said sealing plate and said stripping-off element is disposed adjacent one end of said at least one opening.

5. The sealing plate of claim 1, wherein the at least one opening (5) in said sealing plate is substantially circular, an insert being mounted at at least two distinct loci to a border area of said at least one opening and serving to reduce a cross-sectional area of said at least one opening (5) to form a nozzle.

6. The sealing plate of claim 5, wherein a further opening (77) is formed in said sealing plate, said further opening being disposed, with respect to said at least one opening (5), such that said stripping-off element (76) is provided on one side of said at least one opening and said further opening is spaced from said at least one opening in a direction of rotation of said rotor unit.

7. The sealing plate according to claim 1, wherein said sealing plate comprises two separate parts, said parts cooperating to define an annular ring.

8. The sealing plate of claim 7, wherein said two parts are each shaped as a semi-circular ring segment.

9. The sealing plate according to claim 1, wherein the elastic plate is formed from a vulcanized rubber material.

* * * * *